United States Patent
Lin et al.

(10) Patent No.: US 8,648,956 B2
(45) Date of Patent: Feb. 11, 2014

(54) IMAGE CAPTURE DEVICE AND DUSTPROOF METHOD THEREOF

(75) Inventors: Chao-Yi Lin, Zhubei (TW); Ding-Shang Hsu, Zhubei (TW)

(73) Assignee: Altek Corporation, Hsinchu (TW)

( * ) Notice: Subject to any disclaimer, the term of this patent is extended or adjusted under 35 U.S.C. 154(b) by 85 days.

(21) Appl. No.: 13/558,902

(22) Filed: Jul. 26, 2012

(65) Prior Publication Data

US 2013/0286273 A1    Oct. 31, 2013

(30) Foreign Application Priority Data

Apr. 25, 2012 (TW) .............................. 101114678 A

(51) Int. Cl.
*G02B 13/16* (2006.01)
*H04N 5/225* (2006.01)

(52) U.S. Cl.
USPC .......................................... 348/335; 396/176

(58) Field of Classification Search
USPC .......................................... 348/335; 396/176
See application file for complete search history.

(56) References Cited

U.S. PATENT DOCUMENTS

2007/0264001 A1* 11/2007 Tsai et al. ..................... 396/176

* cited by examiner

*Primary Examiner* — Roberto Velez
*Assistant Examiner* — Stephen Coleman
(74) *Attorney, Agent, or Firm* — Wang Law Firm, Inc.; Li K. Wang; Stephen Hsu

(57) ABSTRACT

An image capture device and a dustproofing method thereof. The image capture device comprises a switch module, optical-component adaptor module, optical-component adaptor detecting module, mask module, power detecting module and controlling module. The switch module switches the image capture device on or off and produces an on signal or off signal correspondingly. The optical-component adaptor detecting module detects whether a removable optical-component is connected with the optical-component adaptor module and produces a detecting signal. The power detecting module measures the residual power in the image capture device and produces a residual power signal. The controlling module, according to the on signal, off signal, detecting signal and the residual power signal controls the mask module to shield or un-shield the photosensor. Therefore, when the image capture device is powered off or during replacement of removable optical-components, the mask module shields the photosensor to render it dustproof.

16 Claims, 8 Drawing Sheets

IMAGE CAPTURE DEVICE AND DUSTPROOF METHOD THEREOF

CROSS-REFERENCE TO RELATED APPLICATION

This application claims the benefit of Taiwan Patent Application No. 101114678, filed on Apr. 25, 2012, in the Taiwan Intellectual Property Office, the disclosure of which is incorporated herein in its entirety by reference.

BACKGROUND OF THE INVENTION

1. Field of the Invention

The present invention relates to an image capture device and a dustproof method thereof, and more particularly to the image capture device and a dustproof method of the image capture device that use a mask module to shield a photosensor to achieve the dustproof effect.

2. Description of Related Art

Conventional interchangeable-lens digital cameras (such as digital single lens reflex cameras) generally have a high image quality or allow users to change the lens with an appropriate focal length range to meet different requirements for portrait or scenery photography. With the severe price competition among manufacturers, the interchangeable-lens digital cameras become a necessary 3C product for almost everyone. Although the interchangeable-lens digital camera provides a function of changing the lens, it also brings troubles to users. For example, most interchangeable lens digital cameras have an adapter module with a hole for movably installing or removing the lens, and an opening, and the opening is exposed after the adapter module is removed, so that dust or foreign substances may enter into the interchangeable lens digital camera and adhere or attach on a photosensor during the process of changing the camera lens. As a result, the quality of images captured by the interchangeable-lens digital camera will be affected.

Among the prior arts, some manufacturers install a lens or a filter onto the photosensor to cover the photosensor and isolate dust or foreign substances from falling or attaching onto the photosensor, and further install a vibrating component and its corresponding circuit to perform a vibration dust removal operation. However, products of this sort are definitely a hindrance to the development of the increasingly smaller design of the products.

In view of the aforementioned problems, the inventor of the present invention designed and developed an image capture device and a dustproof method to overcome the problems of the prior art and to improve industrial applications.

SUMMARY OF THE INVENTION

Therefore, it is a primary objective of the invention to provide an image capture device and a dustproof method thereof to overcome the problem of the prior art that incurs a high cost and a technical difficulty to miniaturize the image capture device.

To achieve the foregoing objective, the present invention provides an image capture device, comprising: a switch module, an optical-component adaptor module, an adaptor detecting module, a mask module, a power detecting module and a controlling module. The switch module controls the image capture device to be turned on or off to generate an ON signal or an OFF signal correspondingly. The optical-component adaptor module couples a removable optical component to the image capture device. The adaptor detecting module detects whether the removable optical component is coupled to the optical-component adaptor module and generates a detecting signal. The mask module movably shields a photosensor of the image capture device. The power detecting module detects a residual power value of a power storage module of the image capture device and generates a residual power signal. The controlling module is electrically coupled to the switch module, and the adaptor detecting module and the power detecting module control the mask module to unshield or shield the photosensor according to the ON signal, the OFF signal, the detecting signal or the residual power signal.

Wherein, the controlling module controls the mask module to unshield the photosensor when the controlling module receives the ON signal; and the controlling module controls the mask module to shield the photosensor according when the controlling module receives the OFF signal.

Wherein, when the controlling module receives the detecting signal the controlling module determines whether or not the removable optical component is coupled to the image capture device according to the detecting signal; if the controlling module does not receive the detecting signal, then the controlling module controls the mask module to shield the photosensor; and if the controlling module receives the detecting signal, then the controlling module controls the mask module to unshield the photosensor.

Wherein, the controlling module determines whether the residual power signal is smaller than a threshold value when the controlling module receives a residual power signal; if yes, then the controlling module controls the mask module to shield the photosensor.

Wherein, the mask module is a leaf assembly.

Wherein, the optical-component adaptor module comprises a contact, and the removable optical component can be connected to the optical-component adaptor module to trigger the contact to generate a control signal, such that the controlling module controls the mask module to unshield the photosensor.

Wherein, when an external force presses on the contact, the contact generates the control signal.

Wherein, the image capture device comprises a first power mode and a second power mode. The first power mode is a power storage module for supplying power to image capture device for the normal operation of the image capture device; and the second power mode is a power storage module for supplying power to the image capture device only when the image capture device is turned off, so that the contact generates the control signal, and the controlling module controls the mask module to unshield the photosensor.

To achieve the aforementioned objective, the present invention further provides a dustproof method applied in an image capture device, and the dustproof method comprises the following steps:

Providing a mask module to movably shield a photosensor.

Using a switch module to switch the image capture device on or off, and generate an ON signal or an OFF signal correspondingly.

Providing an optical-component adaptor module to couple a removable optical component to the image capture device.

Providing an adaptor detecting module to detect whether the removable optical component is coupled to optical-component adaptor module, and generate a detecting signal.

Using a residual power detecting module to detect a residual power value of a power storage module of the image capture device, and generate a residual power signal.

Using a controlling module to control the mask module to shield or unshield the photosensor according to the ON signal, the OFF signal, the detecting signal or the residual power signal.

Wherein, the controlling module controls the mask module to unshield the photosensor when the controlling module receives the ON signal; and the controlling module controls the mask module to shield the photosensor when the controlling module receives the OFF signal.

Wherein, the dustproof method further comprises the following step. The controlling module determines whether the removable optical component is coupled to the image capture device according to the detecting signal; if the controlling module does not receive the detecting signal, then the controlling module controls the mask module to shield the photosensor; if the controlling module receives the detecting signal, then the controlling module controls the mask module to unshield the photosensor.

Wherein, the dustproof method further comprises the following step. The controlling module determines whether the residual power signal is smaller than a threshold value when the controlling module receives a residual power signal; if yes, then the controlling module controls the mask module to shield the photosensor.

Wherein, the mask module is a leaf assembly.

Wherein, the optical-component adaptor module comprises a contact, and the dustproof method further comprises the following step. Connecting the removable optical component to the optical-component adaptor module to trigger the contact to generate a control signal. The controlling module controls the mask module to unshield the photosensor.

Wherein, the dustproof method further comprises the following step. Using an external force to press on the contact, such that the contact generates a control signal.

Wherein, the image capture device comprises a first power mode and a second power mode. The first power mode is a power storage module for supplying power to image capture device for the normal operation of the image capture device; and the second power mode is a power storage module for supplying power to the image capture device only when the image capture device is turned off, so that the contact generates the control signal, and the controlling module controls the mask module to unshield the photosensor.

In summation, the image capture device and the dustproof method in accordance with the present invention have one or more of the following advantages:

(1) The image capture device and the dustproof method in accordance with the present invention can use a switch module or a power detecting module to shield the photosensor when the mask module of the image capture device is turned off or the electric power is low, so as to reduce the possibility for dust or foreign substances from entering into the image capture device.

(2) The image capture device and the dustproof method in accordance with the present invention can use an optical-component adaptor module or a contact to shield the photosensor when the mask module is not connected to the optical component, so as to reduce the possibility for dust or foreign substances from entering into the image capture device.

(3) The image capture device and the dustproof method in accordance with the present invention can use the mask module to shield the photosensor, so as to reduce the number of components and related circuits installed.

DETAILED DESCRIPTION OF THE PREFERRED EMBODIMENTS

The technical contents and characteristics of the present invention will be apparent with the detailed description of a preferred embodiment accompanied with related drawings as follows. For simplicity, same numerals are used in the following preferred embodiment to represent respective same elements.

The image pickup device of the present invention can be an interchangeable-lens camera or a digital single lens reflex camera. To facilitate the description of the technical characteristics of the present invention, the interchangeable-lens camera is used as an example in the following preferred embodiments, but the invention is not limited to the interchangeable-lens camera only.

Figure 1:
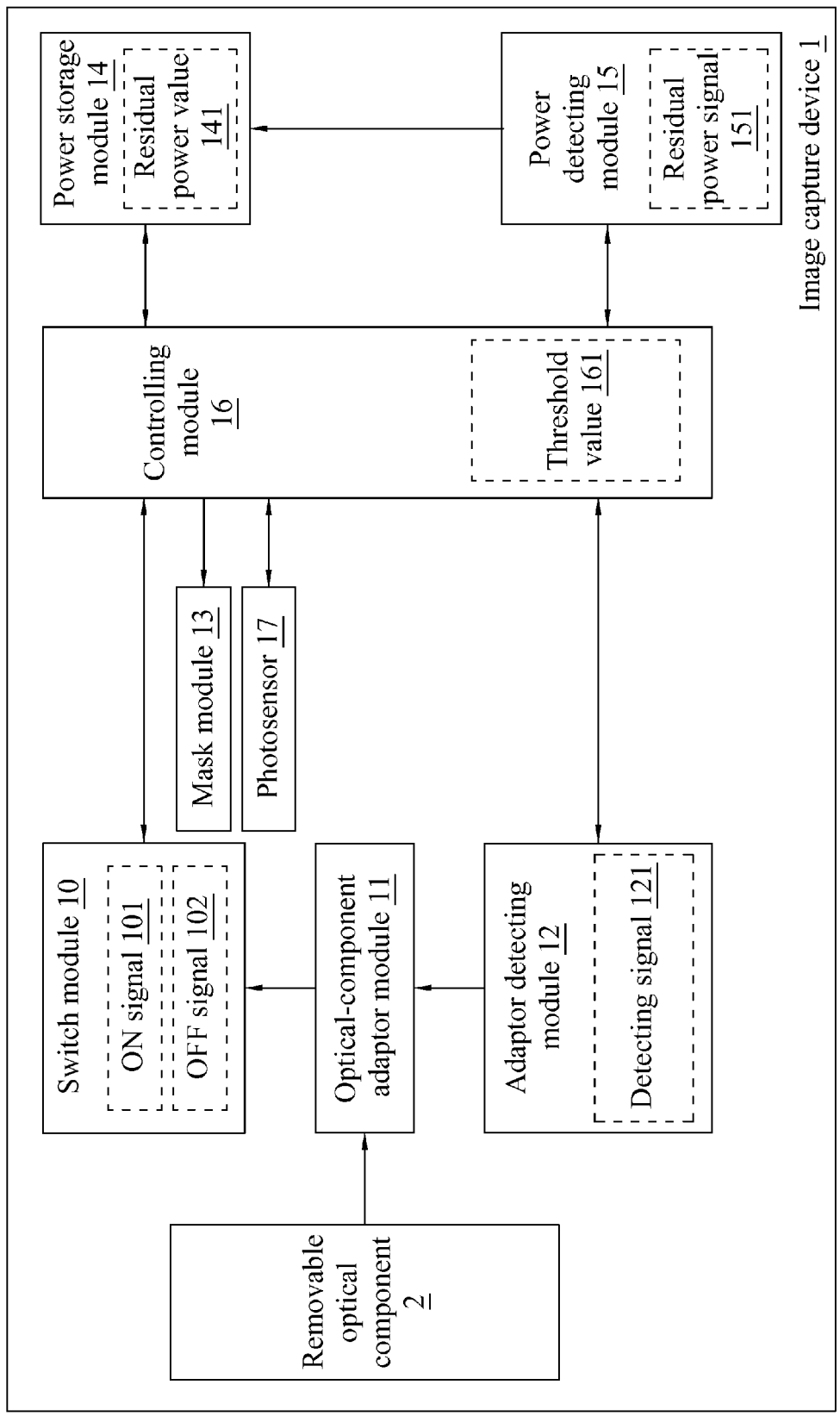
FIG. 1 is a block diagram of an image capture device in accordance with a preferred embodiment of the present invention.
Figure 2:
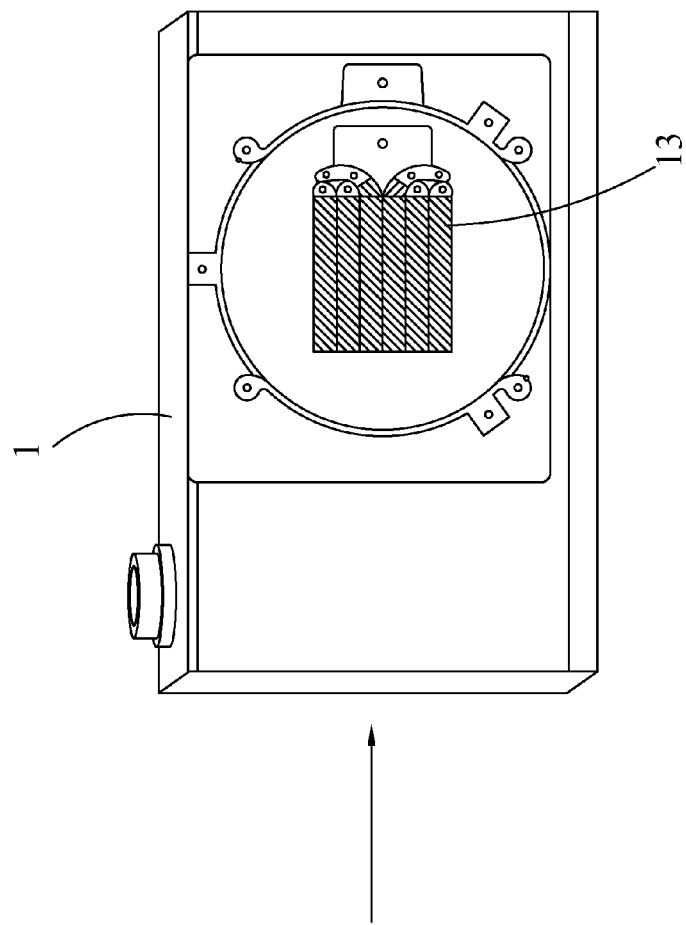
FIG. 2 is a schematic view of a mask module of an image capture device in accordance with a preferred embodiment of the present invention.
Figure 2:
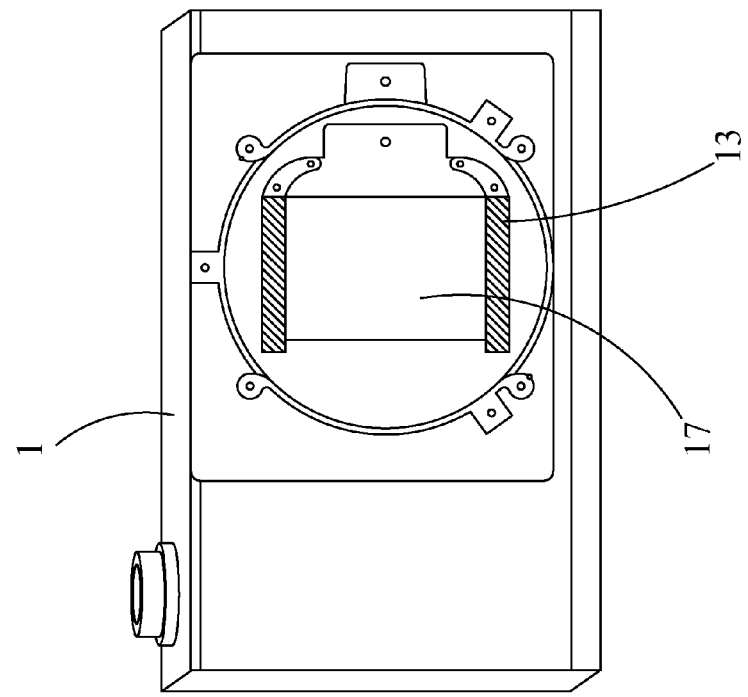

With reference to FIGS. 1 and 2 for a block diagram of an image capture device and a schematic view of a mask module of the image capture device in accordance with a preferred embodiment of the present invention respectively, the image capture device 1 comprises a switch module 10, an optical-component adaptor module 11, an adaptor detecting module 12, a mask module 13, a power storage module 14, a power detecting module 15, a controlling module 16 and a photosensor 17. The switch module 10 controls the image capture device 1 to be turned on or off to generate an ON signal 101 or an OFF signal 102 correspondingly. The optical-component adaptor module 11 couples a removable optical component 2 to the image capture device 1. The adaptor detecting module 12 detects whether the removable optical component 2 (such as a lens) is coupled to the optical-component adaptor module 11 to generate a detecting signal 121. Wherein, the detection made by the adaptor detecting module 12 may include a continuous detection (pooling) or a passive hardware interrupt to inform the controlling module 16.

The mask module 13 movably shields a photosensor 17 of the image capture device 1, wherein the mask module 13 can be a leaf assembly, the photosensor 17 can be a complementary metal oxide semiconductor (CMOS) or charge coupled device (CCD) sensor, and the power storage module 14 can be a chargeable battery such as a lithium-ion battery and a lead acid battery for storing the power required by the operation of the image capture device 1, and the quantity of the stored power is indicated by the measurement of a residual power value 141. The power detecting module 15 detects the residual power value 141 to generate a residual power signal 151. The controlling module 16 is electrically coupled to each module or component, and the controlling module 16 can be a central processing unit (CPU) or a micro processing unit. The controlling module 16 controls the mask module 13 to unshield or shield the photosensor 17 according to the ON signal 101, the OFF signal 102, the detecting signal 121 or the residual power signal 151.

Specifically, when the image capture device 1 enters into a shutdown status (such as after an inspection, during a sales exhibition, or while being stored by users), the switch module 10 generates and transmits an OFF signal 102 to the controlling module 16, such that the controlling module 16 will control the mask module 13 to shield the photosensor 17 accordingly. The arrangement can prevent dust or foreign substance from entering into the image capture device 1 when the image capture device 1 is turned off and the removable optical component 2 is removed. When the image capture device 1 is turned on through the switch module 10, the switch module 10 generates an ON signal 101, such that the controlling module 16 can control the mask module 13 to unshield the photosensor 17 accordingly to allow the image capture device 1 to take the image capture action.

Figure 3:
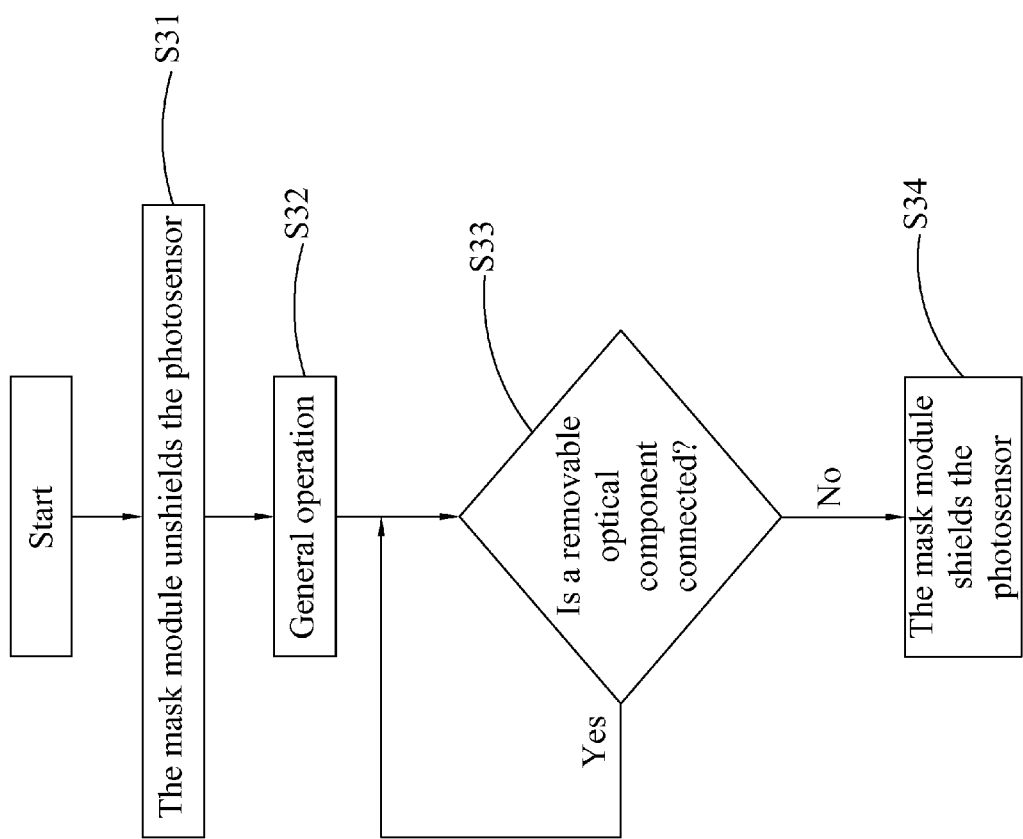
FIG. 3 is a first flow chart of an image capture device in accordance with a preferred embodiment of the present invention.

With reference to FIG. 3 for a first flow chart of an image capture device in accordance with a preferred embodiment of the present invention, when the image capture device 1 is turned on, the switch module 10 generates and transmits an ON signal 101 to the controlling module 16, and the controlling module 16 controls the mask module 13 to unshield the photosensor 17 (as described in the step S31) according to the ON signal 101. Now, the photosensor 17 can receive an optical signal transmitted from the removable optical component 2 and converts the optical signal into an image signal, so that the image capture device 1 can perform an operation of capturing, displaying or storing the images and display (as described in the step S32). When the image capture device 1 performs a general operation, the adaptor detecting module 12 will continue detecting whether the removable optical component 2 is coupled to the optical-component adaptor module 11 (as described in the step S33) to generate a detecting signal 121. And then, the controlling module 16 also continues determining the connecting condition of the removable optical component 2; if the controlling module 16 determines that the removable optical component 2 is still connected, then the image capture device 1 will continue the general operating mode; and if the controlling module 16 determines that the removable optical component 2 is removed, then the controlling module 16 will control the mask module 13 to shield the photosensor 17 immediately (as described in the step S34). The method can prevent dust or foreign substances from entering into the image capture device 1, when a user turns on the image capture device 1 and removes the removable optical component 2. It is noteworthy that the mask module 13 can be shielding the photosensor 17, while the image capture device 1 is still performing general operations such as browsing the images.

Figure 4:
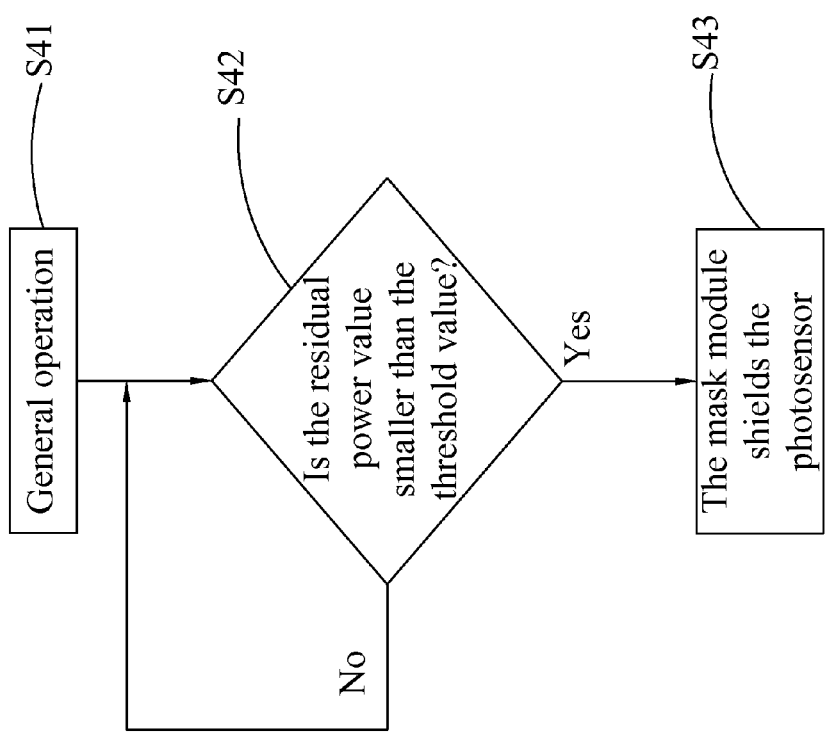
FIG. 4 is a second flow chart of an image capture device in accordance with a preferred embodiment of the present invention.

With reference to FIG. 4 for a second flow chart of an image capture device in accordance with a preferred embodiment of the present invention, when the image capture device 1 is performing a general operation (as described in the step S41), the image capture device will continue detecting whether the removable optical component 2 is connected (as shown in FIG. 2) and the power detecting module 15 will also continue detecting the residual power value 141 of the power storage module 14, and will generate a residual power signal 151 according to the residual power value 141. Now, the controlling module 16 determines whether the residual power signal 151 is smaller than a threshold value 161 according to the residual power signal 151 (as described in the step S42). If the residual power signal 151 is greater than the threshold value 161, the image capture device 1 will continue performing the general operation, and the power detecting module 15 will continue detecting and generating the residual power signal 151, If the controlling module 16 determines that the residual power signal 151 is smaller than the threshold value 161, the controlling module 16 will control the mask module 13 to shield the photosensor 17 (as described in the step S43). Wherein, the threshold value 161 is generally set in the way that the mask module 13 will shield the photosensor 17 if the electric power is low or exhausted. Therefore, the threshold value 161 is equal to the maximum electric power multiplied by a predetermined ratio (such as a residual power of 20%) or a predetermined voltage (such as 3.7V) depending on the actual application, and the invention is not limited to such arrangements only.

Figure 5:
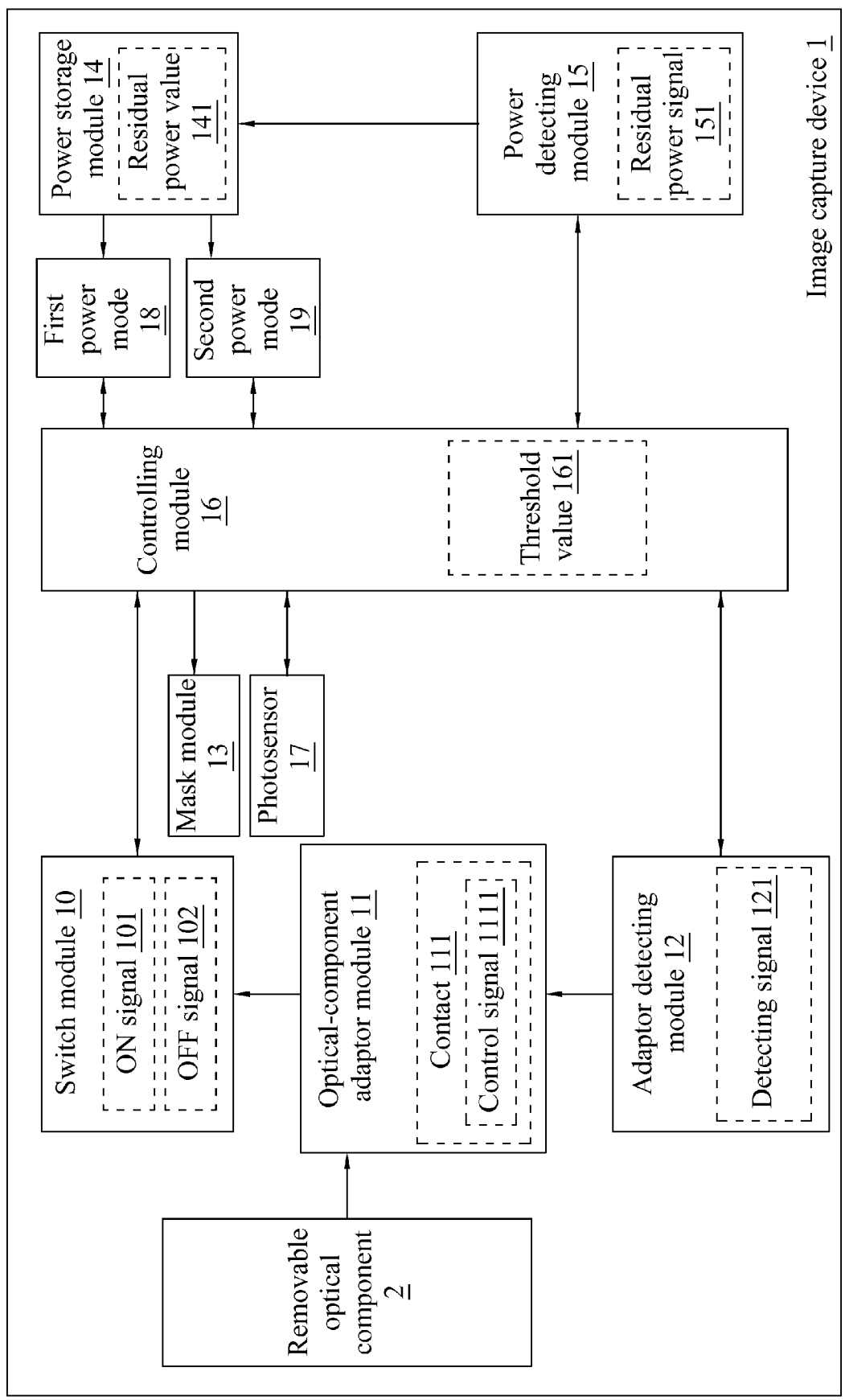
FIG. 5 is a block diagram of an image capture device in accordance with another preferred embodiment of the present invention.

With reference to FIG. 5 for a block diagram of an image capture device in accordance with another preferred embodiment of the present invention, this preferred embodiment is similar to the foregoing preferred embodiment, and thus the similar portion will not be repeated. In this preferred embodiment, the optical-component adaptor module 11 comprises a contact 111 which can be a physical press button. If the contact 111 is pressed, a control signal 1111 will be generated and transmitted to the controlling module 16. Now, the controlling module 16 will control the mask module 13 to unshield the photosensor 17 according to the control signal 1111. The image capture device 1 further comprises a first power mode 18 and a second power mode 19. The first power mode 18 can be a power mode for supplying the power of the power storage module 14 to the image capture device 1 for its normal operation. The second power mode operates when the image capture device 1 is switched off and can be a power mode for supplying the power of the power storage module 14 only to allow the contact 111 to generate the control signal 1111 and the controlling module 16 to control the mask module 13 to unshield the photosensor 17 only when the image capture device 1 is turned off.

Figure 6:
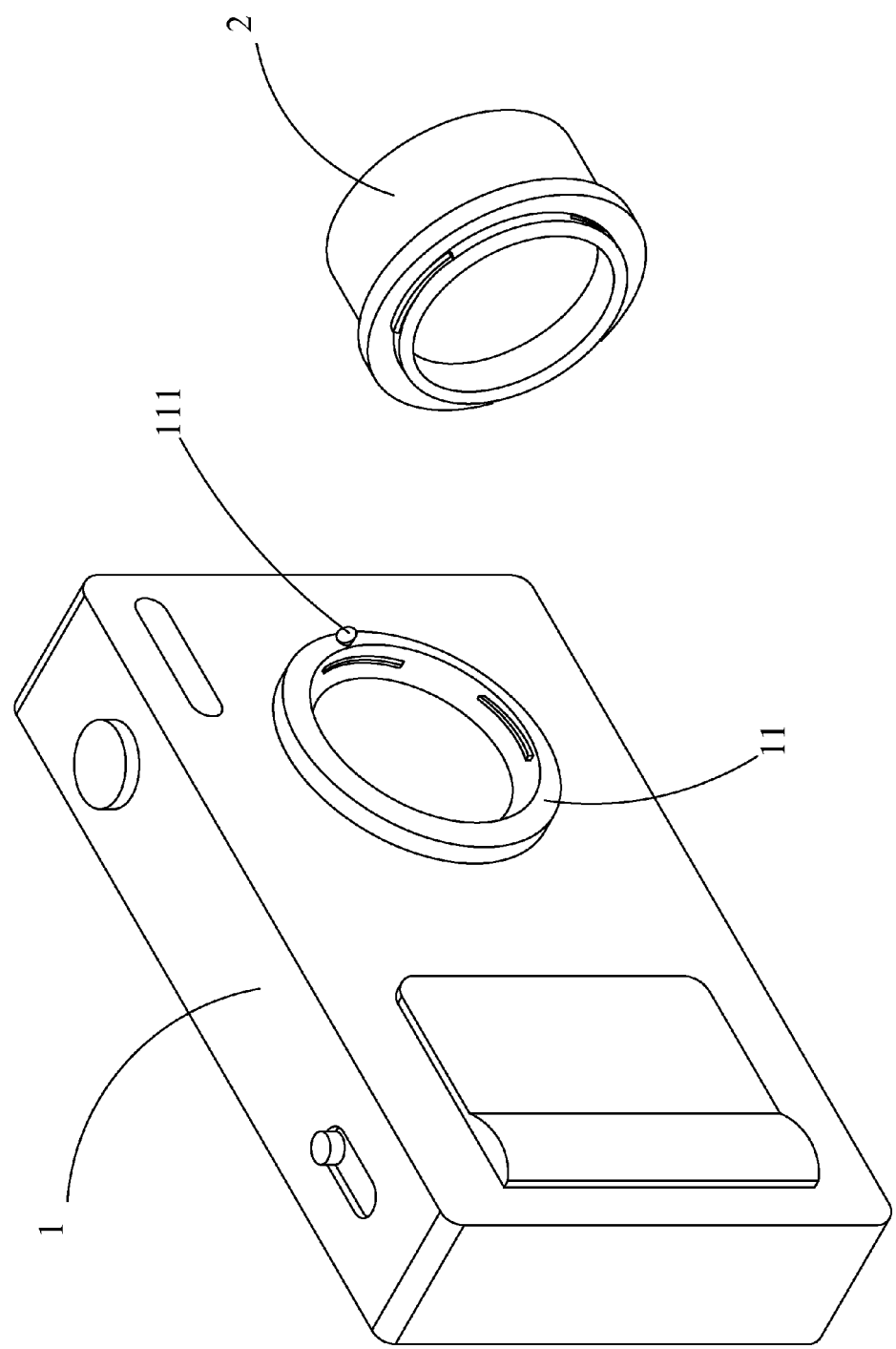
FIG. 6 is a first schematic view of an image capture device in accordance with another preferred embodiment of the present invention.
Figure 7:
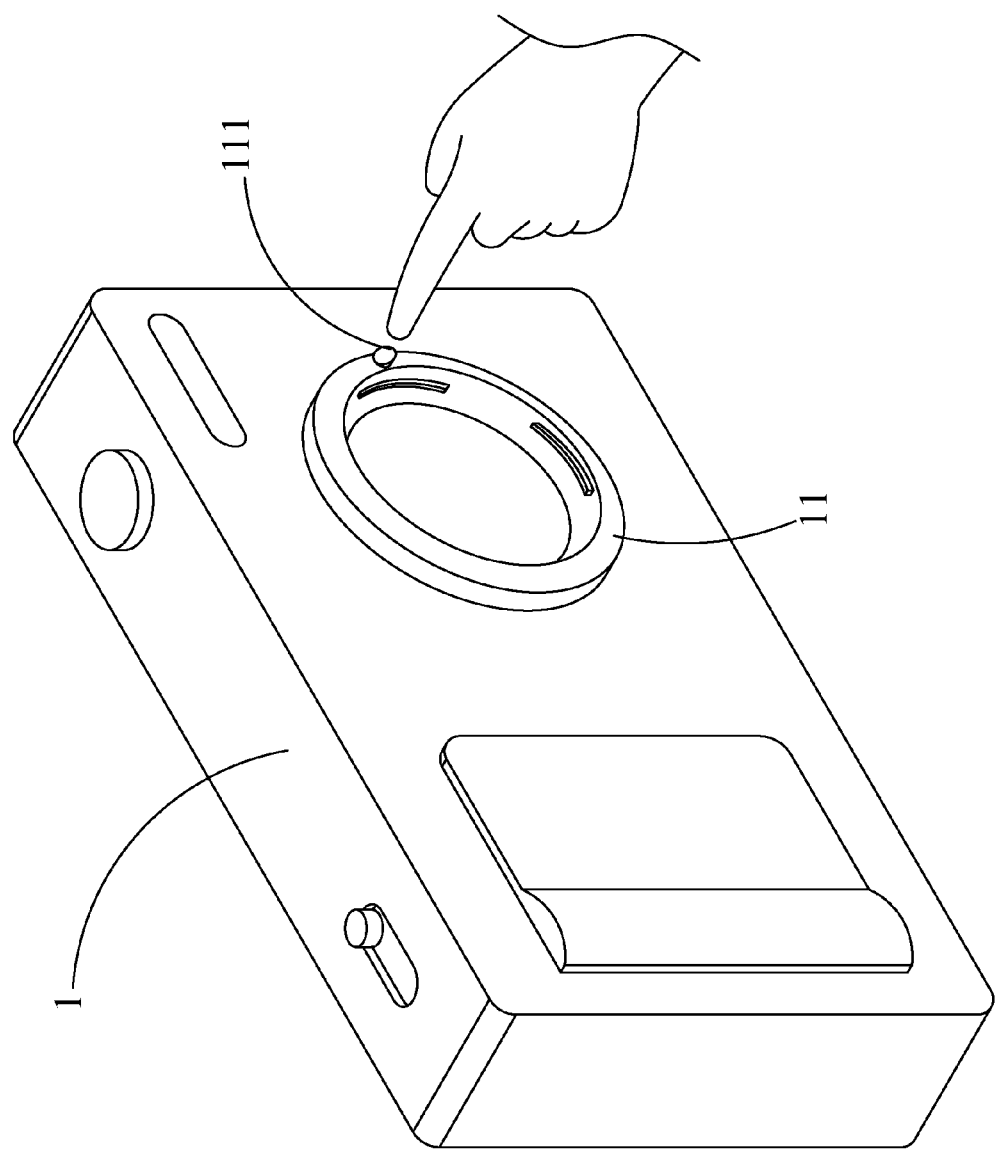
FIG. 7 is a second schematic view of an image capture device in accordance with the other preferred embodiment of the present invention.

With reference to FIGS. 6 and 7 for the first and second schematic views of an image capture device in accordance with another preferred embodiment of the present invention respectively, after the image capture device 1 is turned off, the controlling module 16 controls the mask module 13 to shield photosensor 17 according to the OFF signal. Now, the user can remove the removable optical component 2 to perform operation such as repair and maintenance, or exchanging the removable optical component 2. After the user completes the operation, the user can rotate the removable optical component 2 to the image capture device 1. Although the image capture device 1 is turned off, the second power mode 19 is still operating and will supply an appropriate amount of power required by the contact 111, the mask module 13 and the controlling module 16 with the power saving effect. Therefore, when the removable optical component 2 is rotated and in place, the contact 111 is triggered, so that the contact 111 will generate a control signal 1111, and then the controlling module 16 will control the mask module 13 to unshield the photosensor 17. On the other hand, if the removable optical component 2 is removed, the contact 111 is no longer pressed, so that the control signal 1111 will be interrupted or generated again, so that the mask module 13 will shield the photosensor 17.

On the other hand, if the user removes the removable optical component 2, and wants to perform further dust removal manually, the photosensor 17 is now shielded by the mask module 13 and the user cannot perform the dust removal successfully. Now, the user can press the contact 111 manually, so that the contact 111 is triggered to generate the control signal 1111, and the controlling module 16 can control the mask module 13 to unshield the photosensor 17. And then, the user can perform the dust removal operation manually. Wherein, the way of using the contact 111 to drive the mask module 13 to unshield the photosensor 17 can be configured as follows. The photosensor 17 will be unshielded if the contact 111 is pressed once and shielded if the contact 111 is pressed once again; or the photosensor 17 will be unshielded if the contact 111 is pressed and held for a long time and shielded if the contact 111 is released. However, the invention is not limited to such arrangements only, but can be changed according to the actual requirements or applications.

Figure 8:
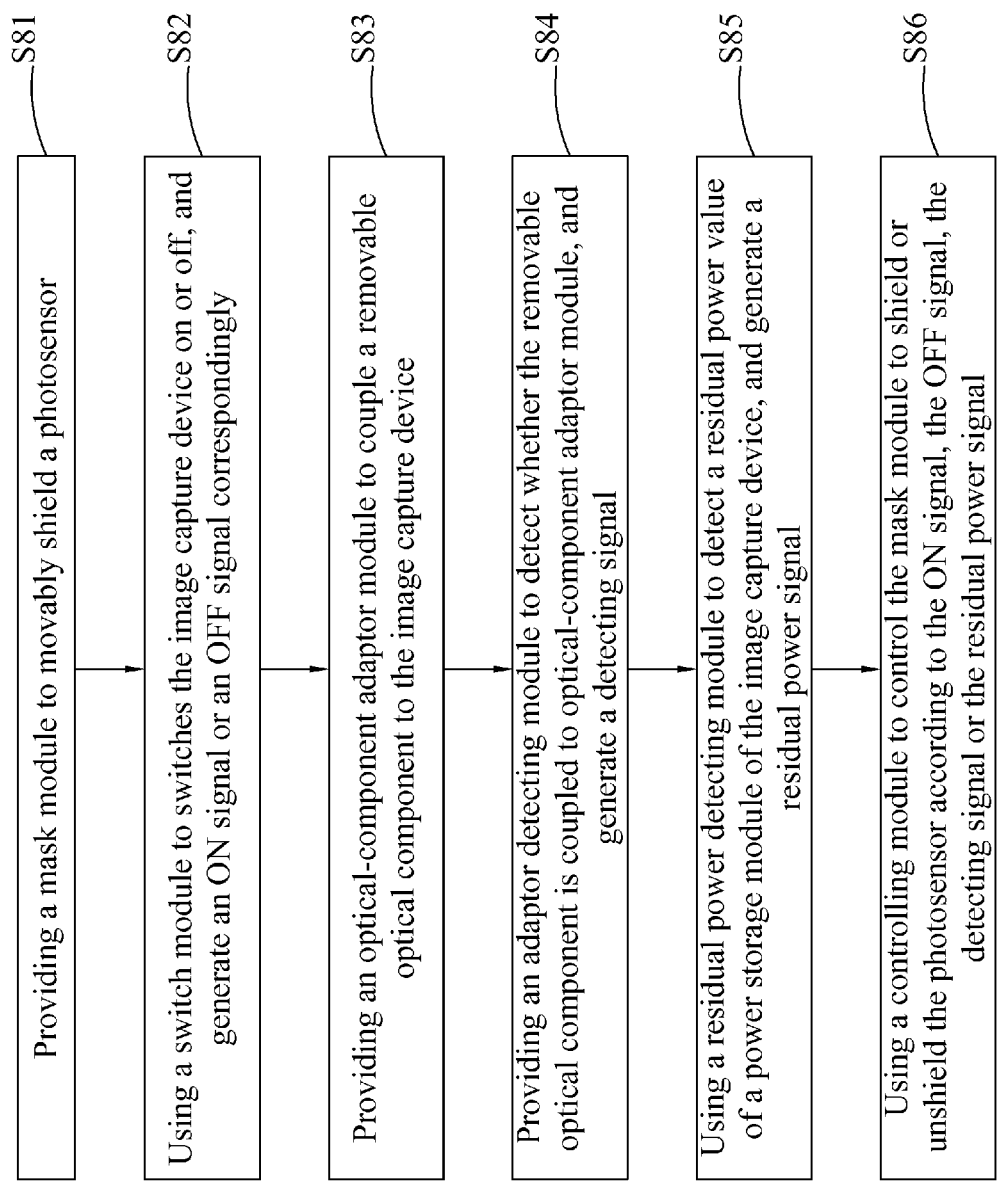
FIG. 8 is a flow chart of a dustproof method in accordance with the present invention.

With reference to FIG. 8 for a flow chart of a dustproof method of the present invention, the dustproof method is applied in an image capture device, and the dustproof method comprises the following steps:

S81: Providing a mask module to movably shield a photosensor.

S82: Using a switch module to turn the image capture device on or off, and generate an ON signal or an OFF signal correspondingly.

S83: Providing an optical-component adaptor module to couple a removable optical component to the image capture device.

S84: Providing an adaptor detecting module to detect whether the removable optical component is coupled to optical-component adaptor module, and generate a detecting signal.

S85: Using a residual power detecting module to detect a residual power value of a power storage module of the image capture device, and generate a residual power signal.

S86: Using a controlling module to control the mask module to shield or unshield the photosensor according to the ON signal, the OFF signal, the detecting signal or the residual power signal.

The details and implementation of the dustproof method of the present invention have been described in the section of the image capture device of the present invention, and thus will not be repeated.

While the invention has been described by means of specific embodiments, numerous modifications and variations could be made thereto by those skilled in the art without departing from the scope and spirit of the invention set forth in the claims.

What is claimed is:
1. An image capture device, comprising:
a photosensor;
A power storage module;
a switch module, switching the image capture device on or off, and generating an ON signal or an OFF signal correspondingly;
an optical-component adaptor module, coupling a removable optical component to the image capture device;
an adaptor detecting module, detecting whether the removable optical component is coupled to the optical-component adaptor module, and generating a detecting signal;
a mask module, for movably shielding the photosensor;
a power detecting module, detecting a residual power value of the power storage module, and generating a residual power signal; and
a controlling module, electrically coupled to the switch module, and the adaptor detecting module and the power detecting module controlling the mask module to unshield or shield the photosensor according to the ON signal, the OFF signal, the detecting signal or the power residual power signal.

2. The image capture device of claim 1, wherein when the controlling module receives the ON signal, the controlling module controls the mask module to unshield the photosensor according to the ON signal; and when the controlling module receives the OFF signal, the controlling module controls the mask module to shield the photosensor according to the OFF signal.

3. The image capture device of claim 1, wherein the controlling module determines whether the removable optical component is coupled to the image capture device according to the detecting signal; if the controlling module does not receive the detecting signal, then the controlling module controls the mask module to shield the photosensor; and if the controlling module receives the detecting signal, then the controlling module controls the mask module to unshield the photosensor.

4. The image capture device of claim 1, wherein the controlling module determines whether the residual power signal is smaller than a threshold value when the controlling module receives a residual power signal; if yes, then the controlling module controls the mask module to shield the photosensor.

5. The image capture device of claim 1, wherein the mask module is a leaf assembly.

6. The image capture device of claim 1, wherein the optical-component adaptor module comprises a contact, and the removable optical component can be connected to the optical-component adaptor module to trigger the contact to generate a control signal, and the controlling module controls the mask module to unshield the photosensor upon the control signal.

7. The image capture device of claim 6, wherein the contact generates the control signal when an external force presses on the contact.

8. The image capture device of claim 6, wherein the image capture device comprises a first power mode and a second power mode, and the first power mode is that the power storage module supplies power to image capture device for the normal operation of the image capture device; and the second power mode is that the power storage module supplies power to the image capture device only when the image capture device is turned off for allowing the contact to generate the control signal and allowing the controlling module controls the mask module to unshield the photosensor upon the control signal.

9. A dustproof method, applied in an image capture device, comprising the steps of:
providing a mask module to movably shield a photosensor;
using a switch module to control the image capture device to be turned on or off, and generate an ON signal or an OFF signal correspondingly;
providing an optical-component adaptor module to couple a removable optical component to the image capture device;
providing an adaptor detecting module to detect whether the removable optical component is coupled to optical-component adaptor module and generate a detecting signal;
using a power detecting module to detect a residual power value of a power storage module of the image capture device and generate a residual power signal; and
using a controlling module to control the mask module to shield or unshield the photosensor according to the ON signal, the OFF signal, the detecting signal or the residual power signal.

10. The dustproof method of claim 9, wherein the controlling module controls the mask module to unshield the photosensor when the controlling module receives the ON signal; and the controlling module controls the mask module to shield the photosensor when the controlling module receives the OFF signal.

11. The dustproof method of claim 9, further comprising the steps of:
using the controlling module to determine whether the removable optical component is coupled to the image capture device according to the detecting signal;
controlling the mask module to shield the photosensor if the removable optical component is not coupled to the image capture device; and
controlling the mask module to unshield the photosensor if the removable optical component is coupled to the image capture device.

12. The dustproof method of claim 9, further comprising the steps of:
using the controlling module to determine whether the residual power signal is smaller than a threshold value; and
if yes, the controlling module controls the mask module to shield the photosensor.

13. The dustproof method of claim 9, wherein the mask module is a leaf assembly.

14. The dustproof method of claim 9, wherein the adaptor module comprises a contact, and the dustproof method further comprises the steps of:
using the removable optical component to connect the removable optical component to the optical-component adaptor module to trigger the contact to generate a control signal, and the controlling module controls the mask module to unshield the photosensor.

15. The dustproof method of claim 14, further comprising the step of: using an external force to press the contact, such that the contact generates the control signal.

16. The dustproof method of claim 14, wherein the image capture device comprises a first power mode and a second power mode, and the first power mode is a power storage module for supplying power to image capture device for the normal operation of the image capture device, and the second power mode is a power storage module for supplying power to the image capture device only when the image capture device is turned off, so that the contact generates the control signal, and the controlling module controls the mask module to unshield the photosensor.

* * * * *